United States Patent [19]

Hall

[11] Patent Number: 4,856,348
[45] Date of Patent: Aug. 15, 1989

[54] FLOW METER TURBINE

[75] Inventor: Robert E. Hall, Wichita, Kans.

[73] Assignee: Great Plains, Industries, Inc., Wichita, Kans.

[21] Appl. No.: 99,132

[22] Filed: Sep. 21, 1987

Related U.S. Application Data

[63] Continuation of Ser. No. 836,297, Feb. 5, 1986, Pat. No. 4,700,579, which is a continuation of Ser. No. 553,793, Nov. 21, 1983, abandoned.

[51] Int. Cl.⁴ ............................................. G01F 1/115
[52] U.S. Cl. ............................... 73/861.78; 73/861.92
[58] Field of Search .......... 73/861.78, 861.83–861.94; 416/242, 243, DIG. 2

[56] References Cited

U.S. PATENT DOCUMENTS

| 128,338 | 6/1972 | Van Anden . | |
|---|---|---|---|
| 1,719,415 | 7/1929 | Back | 416/243 |
| 2,524,870 | 10/1950 | Adamtchik | 103/115 |
| 2,770,131 | 11/1956 | Sparling . | |
| 3,084,545 | 4/1963 | Waugh . | |
| 3,238,776 | 3/1966 | Potter . | |
| 3,329,021 | 7/1967 | Quesinberry et al. . | |
| 3,332,500 | 7/1967 | Bristol et al. | 416/243 |
| 3,370,465 | 2/1968 | Belle . | |
| 3,452,593 | 7/1969 | Lauter, Jr. . | |
| 3,529,631 | 9/1970 | Riollet | 138/39 |
| 3,534,602 | 10/1970 | Boyd . | |
| 3,623,835 | 11/1971 | Boyd . | |
| 3,686,948 | 8/1972 | Lahaye . | |
| 3,757,578 | 9/1973 | Clinton . | |
| 3,774,448 | 11/1973 | Gass et al. | 73/61 |
| 3,823,310 | 7/1974 | Kalotay et al. | 235/151.34 |
| 3,945,253 | 3/1976 | Liu et al. . | |
| 4,073,601 | 2/1978 | Kress | 416/242 |
| 4,114,440 | 9/1978 | Stapler . | |
| 4,253,341 | 3/1981 | Ikeda et al. | 73/861 |
| 4,265,127 | 5/1981 | Onoda | 73/861 |
| 4,700,579 | 10/1987 | Hall | 73/861.92 |

Primary Examiner—Herbert Goldstein
Attorney, Agent, or Firm—Bill D. McCarthy

[57] ABSTRACT

Improved turbine comprising plural turbine blades supported by a turbine rotor of a flow meter, each turbine blade having a rounded leading edge, a feathered trailing edge, a convave top blade surface and a convex bottom blade surface, the turbine blade tapered from the leading edge to the trailing edge to form a hydrofoil shape defined by empirical profile date.

5 Claims, 2 Drawing Sheets

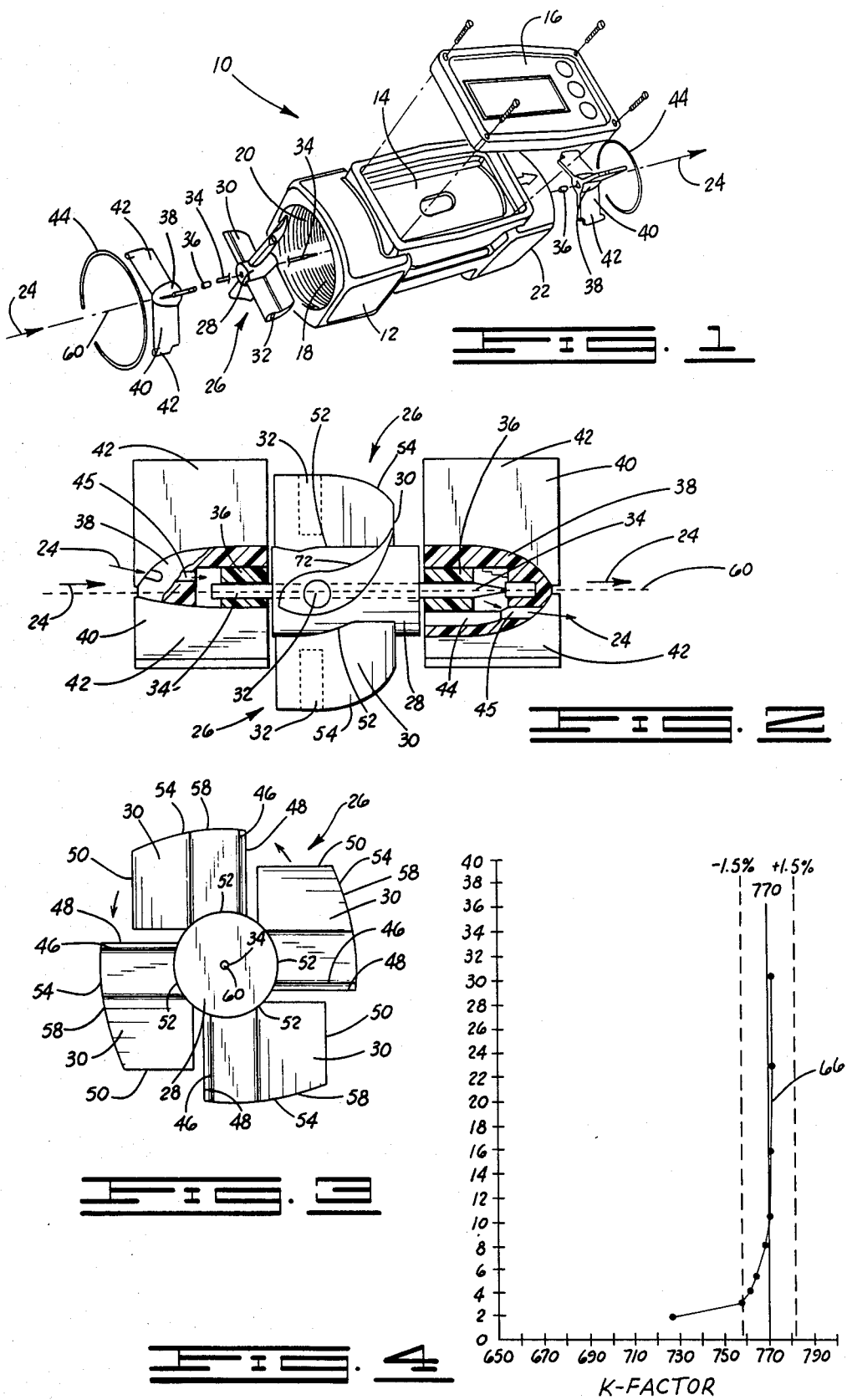

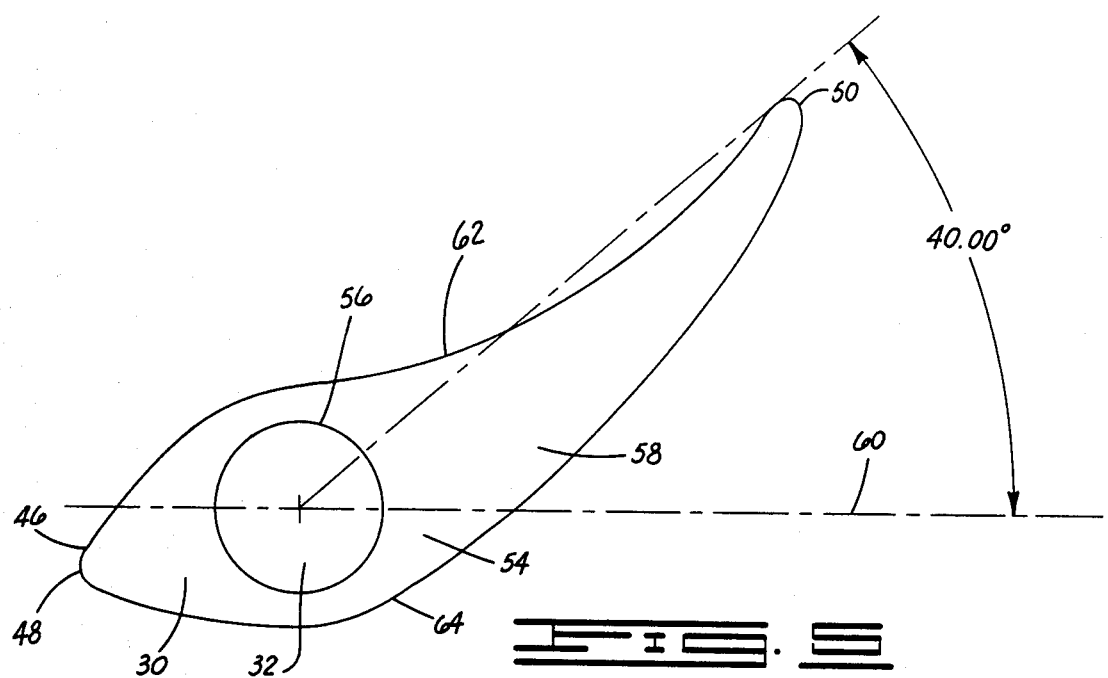

FLOW METER TURBINE

This application is a continuation to U.S. application Ser. No. 826,297, entitled DIGITAL FLOW METER FOR DISPERSING FLUIDS, filed Feb. 5, 1986, now U.S. Pat. No. 4,700,579 and continuation to U.S. application Ser. No. 553,793, entitled DIGITAL FLOW METER FOR DISPENSING FLUIDS, filed Nov. 21, 1983, now abandoned, and incorporated by reference herein as necessary.

BACKGROUND OF THE INVENTION

1. Field of the Invention

The present invention relates generally to fluid flow measurement, and more particularly, but not by way of limitation, to turbine blade improvements for a flow meter.

2. Brief Description of the Prior Art

Heretofore, the size and complexity of fluid flow meters precluded the use of a flow meter which could be used and read at a point of delivery when the fluid is being dispensed. Further, flow meters with normal turbine blades used a flat blade profile of machined metal which is expensive. Also, the high cost of existing self-contained battery powered equipment limited this type of equipment for use by the average consumer.

In the past there have been various types of flow meters with different types of read-out counters and blade designs. These types of flow meters are disclosed in the following U.S. Patents: U.S. Pat. Nos. 3,329,021 to Quesinberry, 3,370,465 to Belle, 3,774,448 to Gass et al., 3,823,310 to Kalotay, et al., 4,265,127 to Onoda, 128,338 to Van Anden, 3,084,545 to Waugh, 3,238,776 to Potter, 3,757,578 to Clinton, 3,452,593 to Lauter, Jr., 3,534,602 to Boyd, 3,623,835 to Boyd, 3,945,253 to Lui et al. and 4,253,341 to Ikeda et al.

None of the above-mentioned patents specifically discloses the unique structure and advantages of the subject improved turbine blade used in a turbine flow meter.

SUMMARY OF THE INVENTION

The present invention provides an improved turbine having turbine blades mounted on a turbine rotor in spaced relationship to each other, the turbine rotatingly supported in a fluid opening of a flow meter housing mounted in a fluid delivery line for dispensing fluids. Each blade of the turbine has a first end attached to the turbine rotor and a second end flattened with an aperture therein for receiving and retaining a ferrous metal slug. Each blade has a rounded leading edge and a feathered trailing edge with a concave top blade surface for receiving fluid flow thereagainst to rotate the turbine. The bottom surface of each blade is convex in shape, and each blade is tapered from the rounded leading edge into the feathered trailing edge so as to form a hydrofoil shape.

One object of the invention is to provide an improved turbine having turbine blades each of which has a profile which insures greater fluid measurement accuracy of fluid delivered through a flow meter, the design of the turbine blades empirically derived to determine a straight line constant "K" factor, over a wide range of flow rates, to insure accuracy of fluid delivered.

Another object of the subject invention is to eliminate the need for machining flat profile turbine blades which is expensive. The turbine blades may be molded using a plastic material and the like with the normal flat profile of the blades modified to provide room for ferrous metal slugs mounted in the ends thereof.

Other objects, advantages and features of the present invention will become clear from the following detailed description of the preferred embodiment when read in conjunction with the drawings and the appended claims.

BRIEF DESCRIPTION OF THE DRAWINGS

FIG. 1 is a perspective view of a flow meter with turbine and stationary shaft supports positioned for assembly in the meter.

FIG. 2 illustrates a side view of the turbine mounted on the stationary shaft supports.

FIG. 3 is a front view of the turbine.

FIG. 4 illustrates a plot of a "K" factor (pulses per unit measure) and flow rate (i.e. gpm)

FIG. 5 illustrates an enlarged end view of the turbine blade profile.

DETAILED DESCRIPTION OF THE DRAWINGS

FIG. 1 shows a partially assembled flow meter designated by general reference numeral 10. The flow meter 10 includes a meter housing 12 having a display cavity 14 for receiving a liquid crystal display 16 with a digital counter incorporated therein. The counter is not shown in the drawing. The cavity 14 is also used for receiving electronic counter controls therein. The meter housing 12 further includes a fluid opening 18 therethrough with opposite ends 20 and 22 threaded for coupling a delivery line. The direction of fluid flow is indicated by arrows 24.

A turbine designated by general reference numeral 26 is disposed inside the opening 18. The turbine 26 includes a turbine rotor 28 with a plurality of turbine blades 30 equally spaced around the turbine rotor 28 and extending outwardly therefrom. In this figure and FIG. 2 the turbine 26 is shown with four blades 30 attached to the rotor 28 and at right angles to each other. Mounted in the ends of the blades 30 are ferrous metal slugs 32. The turbine 26 further includes a turbine shaft 34 received therethrough and mounted on support bearings 36. The support bearings 36 are received in a pair of support bases 38 which are a part of a pair of shaft supports 40. Each of the two shaft supports 40 include a plurality of support arms 42 extending outwardly from the support base 38 with the ends of the support arms 42 secured to the sides of the fluid opening 18 and held therein by split rings 44 received in opposite ends 20 and 22 of the opening 18 of the meter housing 12.

In FIG. 2 the turbine 26 with shaft supports 40 are shown in a side view removed from the meter housing 12. In this figure the two support bases 38 are partially cutaway to expose fluid ports 45 therethrough. The fluid ports 45 receive fluid, flowing in the direction of arrows 24, for acting as a washing and cooling agent around and beside the turbine shaft 34 and shaft bearings 36. In this side view an end to end profile of one of the turbine blades 30 with ferrous metal slug 32 is shown. The unique profile features of the blade 30 are discussed in greater detail under the description of FIG. 5.

As the turbine blades 30 rotate on the turbine 26 and turbine shaft 34 in the opening 18, the ferrous slugs 32 move adjacent the outer periphery of the opening 18 and past a pickup coil having a magnet mounted in the end thereof. The pickup coil and magnet are not shown in the drawings. The pickup coil converts the magnetic pulses received by the magnet to a readable electrical count which is sent to a microprocessor. The microprocessor is part of the liquid crystal display 16. The above-mentioned electrical controls are powered by a pair of batteries received in the display cavity 14. The operation of the pickup coil, magnet and electrical controls of the flow meter 10 are discussed more fully in U.S. application Ser. No. 826,297 by the subject inventor. This structure, while very important, is not part of the subject invention as described herein.

Referring now both to FIG. 3, which shows a front view of the turbine 26 with blades 30, and FIG. 5, which illustrates an enlarged end to end view of one of the blades 30, each blade 30 has a leading edge 46 made up of a rounded nose 48 which tapers upwardly into a feathered trailing edge 50. Each blade 30 includes a first end 52 which is secured to the sides for the turbine rotor 26 and equally spaced therearound. While four blades 30 are shown in FIGS. 1, 2 and 3, it should be appreciated that any practical number of blades 30 could be used that are consistent with the critical demands required in the accurate measurement of fluid flow through the flow meter 10. A second end 54 is flattened with an aperture or bore 56 therein for receiving the metal slug 32. The end of the slug 32 is flush with an outer edge or side 58 of the second end 54, and the side 58 is rounded as shown in FIG. 3 to correspond with the circumference of the fluid opening 18.

In FIGS. 1, 2, 3 and 5 a centerline 60 is shown through the center of the fluid opening 18, through the center of the turbine rotor 28 and through the center of the metal slug 32 in the blade 30. The centerline 60 is shown as a point in FIG. 3. From reviewing FIG. 3 and FIG. 5 it will be noted that the rounded nose 48 of the leading edge 46 is below the centerline 60 with the top of the nose 48 merging into a concave top blade surface 62. The concave top blade surface 62 flows upwardly into the feathered trailing edge 50. The bottom of the nose 48 flows slightly downward and then upwardly into a convex bottom blade surface 64. The concave top blade surface 62 is disposed above the centerline 60 and receives the force of fluid flowing in direction 24 to rotate the turbine 26. By positioning the rounded nose 48 below the centerline 60 the angle of attach in engaging the fluid is improved. When viewing the blade 30 end to end as shown in FIG. 2 and FIG. 5 it will be noted that it has a hydrofoil type shape with the concave top blade surface 62 and the convex bottom blade surface 64 tapered upwardly at an angle in the range of 40° as shown.

FIG. 4 illustrates how the unique shape and design of the turbine blades 30 influence the performance and accuracy of the amount of fluid delivered by the flow meter 10. It has been found that the shape of the blades 30 directly influence the "K" factor (pulses per unit measure) over a certain flow range. The vertical line in FIG. 4 shows flow rate from 0 to 40 gallons per minute. Ideally the "K" factor should be a vertical line when plotting the "K" factor vs. flow rate. But as a practical basis, the "K" factor curve shown as line 66 is not a vertical line and has some slope to it; also, at the low end the line 66 has a "knee" shape.

From viewing FIG. 4 it can be appreciated that once the flow meter 10 has begun delivering fluid and at a volume greater than 2 gals. per minute, the pulses per unit measured are plus and minus 1.5% accurate. In this example the pulses number approximately 770 per unit delivered. The straight line constant of the "K" factor helps insure accuracy in the amount of fluid delivered into a storage tank, through a pipeline and similar applications.

To obtain as near as possible the straight line constant of the "K" factor, the shape of blade 30 was empirically derived through trial and error. Once bench testing was complete, computer aided design was used "to determine the shape of the blade 30."

The turbine blade design can be described using typical aircraft wing terminology. The blade 30 when viewed end to end is a thick subsonic highly cambered airfoil with a relatively small leading edge radius. As mentioned above the blade angle is in a range of 40° from the horizontal. The blade or airfoil also has a trailing edge radius as opposed to a sharp or pointed trailing edge. The concave top blade surface 62 acts as a positive-pressure area while the convex bottom blade surface 64 acts as a suction-negative pressure area. The camber line of the blade 30 is displaced below the cord line and toward the convex bottom blade surface 64. When viewing the blades 30 along the axis 60 as shown in FIG. 3, the blades 30 provide a high solidity ratio which is typical in the handling of fluids at subsonic speed.

As mentioned above, extensive testing of various blade designs was conducted with fluids of different viscosities. The unique profile of the blade 30 provided superior performance in a turbine used with a flow meter to accurately and consistantly deliver and measure a desired fluid quantity.

It is clear that the present invention is well adapted to carry out the objects and to attain the ends and advantages mentioned herein as well as those inherent in the invention. While presently preferred embodiments of the invention have been described for the purposes of this disclosure, numerous changes may be made which will readily suggest themselves to those skilled in the art and which are encompassed within the spirit of the invention disclosed and as defined in the appended claims.

What is claimed is:

1. An improved turbine rotatingly supported in a fluid opening of a meter housing of a flow meter, the flow meter mounted in a fluid delivery line for dispensing fluids, the turbine comprising:

a turbine rotor;
   a plurality of turbine blades supported by the turbine rotor, each such turbine blade comprising:
   a first end and a second end, the first end attached to the turbine rotor with the blade extending outwardly therefrom, the second end having a flattened surface with an aperture therein for receiving a ferrous slug, the ferrous slug disposed within the aperture so as to be flush with the flattened surface of the second end;
   a rounded leading edge;
   a feathered trailing edge;
   a first blade surface concave in shape along the length of the blade, the concave first blade surface disposed to receive fluid flow thereagainst to rotate the turbine; and
   an opposed second blade surface convex in shape along the length of the blade, the blade tapered from the rounded leading edge into the feathered trailing edge so that the blade has a hydrofoil shape.

2. Improved turbine blades mounted in a spaced relationship to each other on a turbine rotor of a turbine, the turbine received in a fluid opening of a meter housing of a flow meter, the flow meter mounted in a fluid deliver line for dispensing fluids, each turbine blade comprising:

a first end and a second end, the first end attached to the turbine rotor with the blades extending outwardly therefrom, the second having a flattened surface portion and including an aperture therein for receiving a ferrous slug, the ferrous slug being disposed within the aperture so as to be flush with the flattened surface portion of the second end;

a rounded leading edge;

a feathered trailing edge;

a first blade surface, the first blade surface concave in shape along the length of the blades, the concave first blade surface receiving the force of fluid flow thereagainst to rotate the turbine rotor; and an opposed second blade surface, the second blade surface convex in shape along the length of the blades, the blades, when viewed end to end, are tapered from the rounded leading edge into the feathered trailing edge and have a hydrofoil design.

3. The turbine blades of claim 2 wherein four such blades with the first ends thereof attached to the turbine rotor at 90° separations between adjacent blades.

4. In a flow meter mounted in a fluid delivery line for dispensing fluids, the flow meter having a turbine with a turbine rotor having plural turbine blades extending therefrom and rotatably supported in a fluid opening of flow meter along the centerlines along the length of the flow meter opening and the centerline of the turbine rotor being coincident, and wherein each turbine blade comprises:

a first end and a second end, the first end attached to the turbine rotor with the blade extending outwardly therefrom;

a leading edge made up of a rounded nose, the front of the nose disposed below the centerline of the turbine rotor when viewing the blade end to end;

a feathered trailing edge;

a first blade surface, the first blade surface concave in shape along the length of the blade, the concave first blade surface receiving the force of fluid flow thereagainst and driving the turbine, the concave first blade surface disposed above the centerline of the turbine rotor when viewing the blade end to end; and an opposed second blade surface, the second blade surface convex shaped along the length of the blade, the convex second blade surface disposed below the centerline of the turbine rotor and extending upwardly above the centerline, the blade when viewed end to end being tapered from the rounded leading edge into the feathered trailing edge so that the blade profile forms a hydrofoil shape.

5. The turbine blades of claim 4 in which the second end of each turbine blade has a flattened surface having a bore, the turbine blade further comprising:

a ferrous slug disposed in the bore and flush with the flattened surface of the turbine blade second end.

* * * * *

UNITED STATES PATENT AND TRADEMARK OFFICE
CERTIFICATE OF CORRECTION

PATENT NO. : 4,856,348

DATED : August 15, 1989

INVENTOR(S) : Robert E. Hall

It is certified that error appears in the above-identified patent and that said Letters Patent is hereby corrected as shown below:

TITLE PAGE (cover page) : line 2 of item [63] "Related U.S. Application Data", delete "continuation" and substitute --continuation-in-part-- therefor; and Item [57[ Abstract, line 4, change "convave" to --concave--.

Column 1, line 7, delete "continuation" and substitute --continuation-in-part-- therefor.

Signed and Sealed this

Twenty-third Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,856,348

DATED : August 15, 1989

INVENTOR(S) : Robert E. Hall

It is certified that error appears in the above-identified patent and that said Letters Patent is hereby corrected as shown below:

TITLE PAGE (cover sheet) item [73] Assignee, change "Great Plains, Industries, Inc." to --Great Plains Industries, Inc.--;

TITLE PAGE (cover sheet) line 7, of item [57] Abstract, change "date" to --data--;

Column 2, line 18, after "(i.e. gpm)" insert --.--;

Column 4, lines 10 and 11, change " "to determine the shape of the blade 30" " to read --to determine the shape of the blade 30--; and Column 5 (claim 2), line 4, delete the word "deliver" and substitute the word --delivery-- therefor.

UNITED STATES PATENT AND TRADEMARK OFFICE
CERTIFICATE OF CORRECTION

PATENT NO. : 4,856,348

DATED : August 15, 1989

INVENTOR(S) : Robert E. Hall

It is certified that error appears in the above—identified patent and that said Letters Patent is hereby corrected as shown below:

```
Cover Sheet, section [63], under "Related U.S.
     Application Data", change "Ser. No. 836,297"
     to read --826,297--.
```

Signed and Sealed this

Twenty-sixth Day of November, 1991

*Attest:*

HARRY F. MANBECK, JR.

*Attesting Officer*     *Commissioner of Patents and Trademarks*